UNITED STATES PATENT OFFICE 2,552,591

AROMATIC ACID SYNTHESIS

Walter H. C. Rueggeberg, Russell K. Frantz, and Abram Ginsburg, United States Army No Drawing. Application December 13, 1945, Serial No. 634,888

9 Claims. (Cl. 260—515)

(Granted under the act of March 3, 1883, as amended April 30, 1928; 370 O. G. 757)

The invention described herein may be manufactured and used by or for the Government, for governmental purposes, without the payment to us of any royalty thereon.

This invention relates to production of acids from the corresponding aromatic compound and more particularly to the formation of mono-basic aromatic acids.

It is an object of this invention to produce aromatic acids from aromatic compounds by reaction with liquid phosgene employing a Friedel-Craft type catalyst.

More specifically, this invention comprises reacting hydrocarbons or substituted hydrocarbons of the benzene series with liquid phosgene in the presence of an aluminum chloride catalyst to produce the corresponding aromatic acid.

When benzene and phosgene are reacted in the presence of anhydrous aluminum chloride, benzoyl chloride and benzophenone are produced. As set forth below, the reaction appears to take place in two stages with the intermediate formation of an aluminum chloride-benzoyl chloride complex, which complex can be hydrolyzed to yield benzoic acid. The complex however reacts very rapidly with benzene and forms benzophenone, so that the final product of the above reaction normally consists almost entirely of benzophenone regardless of change in the reaction conditions.

It is therefore the object of this invention to provide a method for reacting benzene, or other aromatic compounds, with phosgene to form a product which is predominantly benzoic acid, or the corresponding aromatic acid.

We have discovered that benzene, or an aromatic compound having at least one unsubstituted carbon in a benzene ring, can be reacted in the presence of a Friedel-Craft type catalyst with liquid phosgene, in the absence of any other solvent, to form a product which is predominantly the desired acid and in which the benzophenone or other phenone impurity is kept at a minimum.

This invention deals wth the production of aromatic acids by reacting phosgene with an aromatic hydrocarbon or substituted hydrocarbon in the presence of a catalyst, e. g. anhydrous aluminum chloride. This process may be formally represented by the following equations, using benzene as an example:

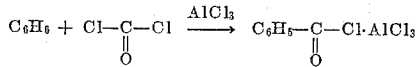
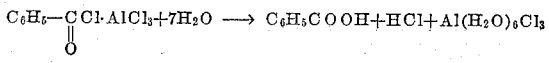

Norris and Fuller (U. S. Patent 1,542,264) have patented a process for making aromatic acids from aromatic hydrocarbons and phosgene. These authors, however, emphasize in their patent that a diluent such as hexane or carbon-bisulfide is a vital part of the reaction procedure. This claim is based on the theory that an inert reaction solvent, such as hexane or $CS_2$, removes the benzoyl chloride-$AlCl_3$ complex from the reaction mixture and this removal of the desired intermediate $AlCl_3$ complex would prevent its reaction with more benzene to form benzophenone, an undesirable by-product in this process.

It was found by the present authors that the process of Norris and Fuller is best conducted in $CS_2$. Hexane was found to produce very low yields of acids. Consequently, the process of Norris and Fuller should be considered from the standpoint of $CS_2$ when compared with the process described in this invention.

It has been found possible, in this invention, to eliminate all inert solvents in the process for making aromatic acids from aromatic compounds having at least one unsubstituted carbon in a benzene ring and phosgene. This was accomplished by conducting the reaction entirely in liquid phosgene.

Several objections to the use of $CS_2$ are the following:

1. Objectionable physical properties.
2. Partially reacts in the described reaction to produce some sulfur-containing compounds which contaminate the desired product.
3. Increased cost of production.

The process described in this invention opposes the views of Norris and Fuller, that a third liquid component is necessary in the reaction between aromatic hydrocarbons and substituted hydrocarbons with phosgene to form aromatic acids employing anyhydrous $AlCl_3$ as the catalyst. Furthermore, this process eliminates the three objections to $CS_2$ as listed above.

At the present time benzoic acid is used by the Armed Forces in a process for making benzyl benzoate, a miticide. The usual processes for making benzoic acid are based on the oxidation or chlorination of toluene, or alkylbenzenes, decarboxylation of phthalic anhydride, etc., all of which are critical items at present. With benzene, phosgene, and $AlCl_3$ still available at the present time, this invention is believed to be of significance since shortages exist in the usual production methods for benzoic acid.

The process here described has peace-time application since through its simplicity, large quantities of a rather pure grade of benzoic acid can be prepared easily.

This invention is not limited to the use of benzene alone. Substances such as toluene (methylbenzene) and halogenated benzenes, as e. g. chlorobenzene, will also undergo reaction with phosgene, in the presence of $AlCl_3$ to form p-toluic acid and p-chlorobenzoic acid, respectively. Generally speaking, alkylbenzenes and halogenated benzenes produced lower yields of the corresponding aromatic acids than benzene produces benzoic acid. Aromatic compounds having at least one unsubstituted ring carbon react to produce the corresponding aromatic acid.

It was also found that the quantity of $AlCl_3$ used in this process, materially affects the reaction rate. Using slightly more than 1 mol of $AlCl_3$ (about 1.5 mol) per mol of benzene, the same yield of benzoic acid can be produced in 6–8 hours as would be obtained in 16–18 hours if only 1 mol of $AlCl_3$ were used per mol of benzene.

The molar ratio of phosgene to benzene may also be varied between considerably wide limits without materially affecting the yield of the product.

EXAMPLES OF THE PROCESS

*Example I*

A mixture consisting of 297 parts (by weight) (6 mol parts) of liquid phosgene and 66.7 parts (by weight) (1 mol part) of anhydrous $AlCl_3$ is placed in a suitable reaction vessel equipped with a thermometer, stirring device, dropping funnel, and gas escape vent, at a temperature below 8° C. The mixture is agitated and 39.1 parts (by weight) (1 mol part) of benzene is added drop-wise to the reaction mixture over a period of time ranging between 5 minutes and several hours, as desired. By means of a chilling device, the reaction mixture is cooled and subsequently agitated at 4–7° C. for 20 hours. At the end of the reaction period, the reaction mixture is poured into an ice-water mixture, the organic layer is separated and dissolved in aqueous NaOH solution.[1] One filtration of the basic aqueous solution serves to remove benzophenone. Addition of a mineral acid, e. g. HCl or $H_2SO_4$ to the filtrate precipitates out 33.2 parts (by weight) of benzoic acid of M. P. 119–122° C.

*Example II*

A mixture consisting of 198 parts (by weight) (4 mol parts) of liquid phosgene and 66.7 parts (by weight) (1 mol part) of anhydrous $AlCl_3$ is placed in a suitable reaction vessel under conditions identical with those described in Example I. 39.1 parts (by weight) (1 mol part) of benzene is added drop-wise to the reaction mixture in 15 minutes at 3–4° C. The reaction mixture is stirred for 24 hours at 4–6° C. The isolation of benzoic acid is carried through in an analogous manner as described in Example I. Yield=34.8 parts (by weight).

*Example III*

A mixture consisting of 198 parts (by weight) (4 mol parts) of liquid phosgene and 100.1 parts (by weight) (1.5 mol parts) of anhydrous $AlCl_3$ is reacted with 39.1 parts (by weight) (1 mol part) of benzene in a manner identical with the procedure described in the aforegoing examples.

[1] The acid can also be isolated by acidic hydrolysis and filtered off directly instead of by alkaline extraction and reprecipitation with acid.

After a reaction period of 6.5 hours at 4–5° C., there is isolated 32.3 parts (by weight) of benzoic acid.

*Example IV*

198 parts (by weight) of liquid phosgene and 66.7 parts (by weight) of anhydrous aluminum chloride are reacted with 56.3 parts (by weight) of monochloro-benzene at 4–8° C. for 20 hours. After isolating the reaction product by the method described previously, there is obtained 7.6 parts (by weight) of p-chlorobenzoic acid, M. P. 239–240° C.

*Example V*

198 parts (by weight) of liquid phosgene, 66.7 parts (by weight) of anhydrous $AlCl_3$, and 46.1 parts (by weight) of toluene are reacted as previously described, for 4 hours at 3–4° C. At the end of the reaction period there is isolated 4.8 parts (by weight) of p-toluic acid, M. P. 178–179° C.

Our invention therefore contemplates the reaction of liquid phosgene with an aromatic compound, having an unsubstituted carbon in a benzene ring, to form a product having a carboxy group in the formerly unsubstituted position. Although other Friedel-Crafts type catalysts are operative, we have found anhydrous aluminum chloride, the most available of this type of catalyst, to be the most satisfactory.

The specific details and examples given above should be construed as illustrative and not by way of limitation.

We claim:

1. A process for the production of aromatic acids, said process comprising reacting, under water-free and carbon sulfide-free conditions, an aromatic compound having at least one substituted ring carbon with aluminum chloride and liquid phosgene in a reaction medium free from any other solvents and thereafter hydrolyzing the reaction product.

2. A process for the production of aromatic acids comprising reacting under water-free and carbon bisulfide-free conditions a compound of the benzene series with aluminum chloride and liquid phosgene in a reaction medium free from any other solvent and thereafter hydrolyzing the reaction product.

3. A process for the production of aromatic acids comprising reacting, under water-free and carbon bisulfide-free conditions, a member of the group consisting of non-chlorinated aromatic hydrocarbons and chlorinated aromatic hydrocarbons with aluminum chloride and liquid phosgene in a reaction medium free from any other solvent and thereafter hydrolyzing the reaction product.

4. The process of claim 1 in which one mol of the aromatic acid is reacted in the presence of more than one mol of anhydrous aluminum chloride with more than one mol of liquid phosgene.

5. The process of claim 2 in which one mol of said compound of the benzene series is reacted in the presence of more than one mol of anhydrous chloride with more than one mol of liquid phosgene.

6. The process of claim 3 in which one mol of the member of the group consisting of non-chlorinated aromatic hydrocarbons and chlorinated aromatic hydrocarbons is reacted in the presence of more than one mol of anhydrous aluminum chloride with more than one mol of liquid phosgene.

7. A process for the production of benzoic acid comprising reaction, under water-free and carbon bisulfide-free conditions, benzene with aluminum chloride and liquid phosgene in a reaction medium free from any other solvent and thereafter hydrolyzing the reaction product.

8. The process of claim 7 in which one mol of benzene is reacted in the presence of more than one mol of aluminum chloride with more than one mol of liquid phosgene.

9. The process for the production of benzoic acid comprising reacting, under water-free and carbon bisulfide-free conditions, one mol of benzene in the presence of 1½ mols of anhydrous aluminum chloride with from 4 to 6 mols of liquid phosgene, and thereafter pouring the reaction mixture into an ice water mixture, separating the organic layer, hydrolyzing the separated layer and recovering benzoic acid.

WALTER H. C. RUEGGEBERG.
RUSSELL K. FRANTZ.
ABRAM GINSBURG.

REFERENCES CITED

The following references are of record in the file of this patent:

UNITED STATES PATENTS

| Number | Name | Date |
|---|---|---|
| 1,542,264 | Norris et al. | June 16, 1925 |

OTHER REFERENCES

Friedel et al.: Annales de Chemie et de Physique (6), vol. 1, page 518 (1884).

Friedel et al.: Berichte der Deutschen Chemischen Gesellschaft, vol. 10, 1854–1858 (1877).

Wilson et al.: Journal of Industrial and Engineering Chemistry, vol. 14, pages 406–409 (1922).

Varshavskii: Chemical Abstracts, vol. 28, col. 5043 (1934).

Anderson: Chemical Abstracts, vol. 37, col. 6527 (1943).